Patented Jan. 6, 1942

2,269,187

UNITED STATES PATENT OFFICE 2,269,187

HALOGENATED BENZOIC ESTER

Gaetano F. D'Alelio, Pittsfield, Mass., assignor to General Electric Company, a corporation of New York No Drawing. Application April 17, 1940, Serial No. 330,113

11 Claims. (Cl. 260—87)

This invention relates to new compositions of matter and more particularly is concerned with the production of compositions comprising essentially halogenated benzoic esters of organic polyhydroxyl compounds.

There long has been need in industry, particularly in the field of electrical insulation, for a flame-resisting plastic composition adapted to be formed into flexible, thin sheets of the thickness of paper or the like and which also could be molded or otherwise shaped for insulating metallic conductors, e. g., wires, and other conducting portions of electrical devices.

Heretofore in the production of a flame-resisting paper or the like it has been necessary to coat or to coat and impregnate the paper with a flame-resisting compound, e. g., boric acid, borax, sulfamic acid, urea phosphates, chlorinated diphenyl compounds, etc. Such methods have been costly and, furthermore, have not been entirely satisfactory for many electrical applications due to the poor electrical characteristics of many of such flame-resisting compounds. In the case of plastic flame-resisting materials it usually has been necessary to modify the basic material, e. g., polyvinyl chloride, by incorporating therewith sufficient plasticizer to impart plastic flow to the basic flame-resisting compound.

I have discovered that a flame-resisting composition adapted to be formed into sheets or molded into various shapes can be prepared by reacting to ester formation a polyhydroxyl compound, more particularly a polyhydroxyl organic compound of high molecular weight, with a halogenated esterifiable benzoic compound, e. g., halogenated benzoyl halide. Illustrative examples of polyhydroxyl compounds which may be employed are starches, normal and degraded celluloses, polymerized vinyl alcohol, partially esterified starches, celluloses and polymerized vinyl alcohols, partially etherized starches, celluloses and polymerized vinyl alcohols, and similar substances.

For optimum flame resistance the esterifiable halogenated benzoic compounds, e. g., halogenated benzoyl halides, used in carrying this invention into effect should contain in the benzene nucleus an average of at least two, preferably three or more, halogen atoms, e. g., chlorine atoms, per benzene nucleus. Of course, where flame resistance of these new esters is of secondary consideration a halogenated benzoic compound, such as halogenated benzoyl halide, containing only one halogen atom in the benzene nucleus may be employed. In the manufacture of polyhalo-benzoyl halides some monohalo-benzoyl halides also may be produced. When such mixed halides are used, the esterification product comprises a mixture of mono-halogenated and poly-halogenated benzoic esters of the polyhydroxyl compound.

In producing these new esterification products I prefer to use a halogenated benzoyl halide containing a plurality of halogen atoms in the benzene nucleus. Illustrative examples of such halides are the di-, tri-, tetra- and penta-halo (-chloro, -bromo, -fluoro and -iodo) benzoyl halides, specifically chlorides, bromides, fluorides and iodides. Mainly for economic reasons I prefer to use a chlorinated benzoyl chloride. More particularly I prefer to use a chlorinated benzoyl chloride containing in the benzene nucleus an average of from three to five chlorine atoms per benzene nucleus, thereby to impart maximum flame resistance to the esterification product.

The extent of the esterification and the number of halogen atoms in the benzene nucleus of the benzoyl halide influence the flame resistance of the final product. Thus, an esterification product of a polyhydroxyl organic compound and a halogenated benzoyl halide containing in the benzene nucleus an average of, say, four halogen atoms per benzene nucleus is more resistant to flame than an esterification product containing in the benzene nucleus an average of less than four halogen atoms, e. g., two or three halogen atoms, per benzene grouping. Also, a halogenated benzoic ester of a polyhydroxyl organic compound wherein all the hydroxyl groups have been esterified has a greater resistance to flame than one in which the polyhydroxyl compound has been only partially esterified, that is, one in which the polyhydroxyl compound still contains free hydroxyl groups. As will be understood by those skilled in the art, when only one of the hydroxyl groups of the organic polyhydroxyl compound is esterified, a halogenated benzoic monoester results; and when a plurality of hydroxyl groups are esterified, a halogenated benzoic polyester is obtained.

The following example illustrates how these new compositions may be prepared:

One mol of a polyhydroxyl organic compound, specifically highly polymerized vinyl alcohol, is caused to react with such number of mols of a nuclearly halogenated benzoyl halide (specifically chlorinated benzoyl halide containing in the benzene nucleus an average of about four chlorine atoms per benzene nucleus) that all or a substantial proportion of the hydroxyl groups of the polymerized vinyl alcohol are esterified. The reaction is carried out at room temperature or, more rapidly, at elevated temperatures in the presence or absence of an alkaline substance, specifically basic materials such as those used in the Schötten-Baumann process of esterification with acyl halides. Examples of such basic materials (Schötten-Baumann esterification catalysts) are sodium and potassium hydroxides, sodium and potassium carbonates, tertiary amines such as trimethyl amine, dimethyl aniline, pyridine, quinoline, etc.; or, in general, basic materials capable of fixing the hydrogen halide liberated during esterification but incapable of fixing the halide reactant itself. The reaction product is washed to remove water-soluble constituents such as the halides of the basic materials used to facilitate esterification. The washed material is dried at a suitable temperature, e. g., at room temperature or at elevated temperature, and at atmospheric or sub-atmospheric pressure. The material also may be dried while being calendered. If desired, the washed ester may be made in the form of a paper-like product by suitably dispersing the material in water and preparing a thin, flexible sheet article of manufacture therefrom with apparatus and technique such as is used in the manufacture of paper.

If the washed product has not been preformed prior to or during drying, the dried ester usually is obtained as a granular or powdery mass. It is white and thermoplastic. It softens at temperatures of the order of 100° to 110° C. It can be molded into a variety of shapes and can be sheeted on hot rolls. When placed in the flame it burns with difficulty while in the flame but does not support combustion when removed from the flame.

The properties of the halogenated benzoic esters of cellulose (e. g., di-, tri-, tetra- and pentahalobenzoic cellulose esters), specifically the chlorinated benzoic polyesters of cellulose, are much the same as regards flame resistance, softening point, color, ability to be sheeted, molded, made into paper-like products, etc., as described above with particular reference to the chlorinated benzoic polyesters of polymerized vinyl alcohol. However, the properties of the halogenated benzoic esters of normal and degraded cellulose are influenced to some extent by the molecular weight of the starting cellulosic material. The physical properties and general appearance of the halogenated benzoic esters of non-degraded (normal) cellulose are, in pulp or paper-like form, very similar to those of a pulp or paper made from untreated cellulose. The halogenated benzoic esters of cellulose are wet with more difficulty (that is, they are more resistant to water) than the original cellulose from which they are derived.

Although I have described my invention with particular reference to the use of a halogenated benzoyl halide in the production of these new esters, it will be understood of course that other methods may be employed in their preparation. Thus, instead of using a nuclearly halogenated benzoyl halide, these new nuclearly halogenated benzoic esters of organic polyhydroxyl compounds, specifically nuclearly halogenated benzoic esters of polymerized vinyl alcohol, also may be prepared by suitably reacting halogenated benzoic acid or anhydride with the organic polyhydroxyl compound.

If desired, these new esters may be modified with various addition agents to alter their physical properties and general appearance, as for example dyes, pigments, lubricants, fillers such as asbestos, fiber glass, mineral wool, clays, mica, quartz sand, titanium dioxide, etc.

The new compositions of this invention are particularly suitable for use where a flame-resisting compound is desired. For instance, they may be used advantageously for insulating wires and cables, either alone or in combination with known insulating materials, e. g., fiber glass in continuous filament, thread, fabric (woven or felted) or other form, asbestos in felted, tape, powdered or other form, etc. In thin sheet form these new esters may be applied to metallic conductors as insulation by the usual strip-covering methods. Also, they may be extruded upon plain, enameled (or otherwise insulated) conductors to form a continuous, uniform, electrically insulating covering, thereby to obtain insulated electrical conductors and cables of high dielectric strength and outstanding flame resistance.

What I claim as new and desire to secure by Letters Patent of the United States is:

1. A nuclearly halogenated benzoic ester of polymerized vinyl alcohol.
2. A nuclearly halogenated benzoic polyester of polymerized vinyl alcohol, said polyester containing in the benzene nuclei thereof an average of at least two halogen atoms per benzene nucleus.
3. A nuclearly chlorinated benzoic polyester of polymerized vinyl alcohol, said polyester containing in the benzene nuclei thereof an average of at least two chlorine atoms per benzene nucleus.
4. A nuclearly chlorinated benzoic polyester of polymerized vinyl alcohol, said polyester containing in the benzene nuclei an average of from three to five chlorine atoms per benzene nucleus.
5. A nuclearly halogenated benzoic polyester of polymerized vinyl alcohol.
6. A polymerized vinyl alcohol polyester of a nuclearly chlorinated benzoic acid containing in the benzene nuclei an average of about four chlorine atoms per benzene nucleus.
7. A paper-like product which is resistant to flame, said product comprising essentially a nuclearly chlorinated benzoic polyester of polymerized vinyl alcohol, said polyester containing in the benzene nuclei thereof an average of at least two chlorine atoms per benzene nucleus.
8. A shaped product which is resistant to flame, said product comprising essentially a halogenated benzoic polyester of polymerized vinyl alcohol, said polyester containing in the benzene nuclei thereof an average of at least two halogen atoms per benzene nucleus.
9. The method of producing new esters which comprises reacting to ester formation a nuclearly halogenated benzoyl halide with polymerized vinyl alcohol.
10. As a new chemical compound, a nuclearly chlorinated benzoic ester of polymerized vinyl alcohol.
11. The method which comprises causing to react to ester formation, in the presence of a Schötten-Baumann esterification catalyst, a nuclearly chlorinated benzoyl chloride and polymerized vinyl alcohol.

GAETANO F. D'ALELIO.